United States Patent
Tsubota et al.

(10) Patent No.: US 8,362,437 B2
(45) Date of Patent: Jan. 29, 2013

(54) RADIOGRAPHIC IMAGING DEVICE

(75) Inventors: Keiji Tsubota, Kanagawa (JP); Takashi Shoji, Kanagawa (JP); Yutaka Yoshida, Kanagawa (JP); Naoyuki Nishino, Kanagawa (JP); Kiyoshi Kondou, Kanagawa (JP); Yuji Kurachi, Kanagawa (JP); Yasunori Ohta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 618 days.

(21) Appl. No.: 12/626,694

(22) Filed: Nov. 27, 2009

(65) Prior Publication Data
US 2010/0140490 A1     Jun. 10, 2010

(30) Foreign Application Priority Data
Dec. 4, 2008 (JP) ................................ 2008-309533

(51) Int. Cl.
*G01T 1/24* (2006.01)
(52) U.S. Cl. ............................. 250/370.09; 250/370.08
(58) Field of Classification Search ............. 250/370.09, 250/370.08
See application file for complete search history.

(56) References Cited

U.S. PATENT DOCUMENTS

| 6,630,676 | B2 * | 10/2003 | Takemoto | 250/370.09 |
| 2008/0011958 | A1 * | 1/2008 | Endo et al. | 250/370.08 |

FOREIGN PATENT DOCUMENTS

| JP | 5-329144 | 12/1993 |
| JP | 2003-163343 A | 6/2003 |
| JP | 2005-006888 A | 1/2005 |

OTHER PUBLICATIONS

Partial English language translation of the following: Office action dated Nov. 13, 2012 from the Japanese Patent Office in a Japanese patent application corresponding to the instant patent application. This office action translation is submitted now in order to supplement the understanding of patent document JP 5-329144 which is cited in the office action and is being disclosed in the instant Information Disclosure Statement.

* cited by examiner

*Primary Examiner* — David Porta
*Assistant Examiner* — Mindy Vu
(74) *Attorney, Agent, or Firm* — SOLARIS Intellectual Property Group, PLLC

(57) ABSTRACT

There is provided a radiographic imaging device including: a radiation detector; a switching power supply; a storage section; a reading section; and a control section that controls the switching power supply so as to implement switching control and cause electricity to be accumulated in the storage section at a time when charge is not being read by the reading section, and stop switching control at a time when charge is being read by the reading section.

6 Claims, 6 Drawing Sheets

RADIOGRAPHIC IMAGING DEVICE

CROSS-REFERENCE TO RELATED APPLICATION

This application is based on and claims priority under 35 USC 119 from Japanese Patent Application No. 2008-309533 filed on Dec. 4, 2008, the disclosure of which is incorporated by reference herein.

BACKGROUND

1. Technical Field

The present invention relates to a radiographic imaging device.

2. Related Art

In recent years, FPDs (flat panel detectors), in which a radiation-sensitive layer is disposed on a TFT (thin film transistor) active matrix substrate and radiation can be directly converted to digital data, have been made practical. Using these FPDs and the like, portable radiographic image imaging devices (below referred to as electronic cassettes) have been made practical, in which image information that represents a radiographic image expressed by irradiated radiation is generated and the generated image information is stored.

In such an electronic cassette, when a voltage of a predetermined voltage level for driving the FPD is to be obtained from a battery, it is generally more efficient in terms of energy to convert a voltage level of supplied electricity by switching control with a switching power supply, such as a DC-DC converter or the like, to obtain the voltage of the predetermined voltage level.

Japanese Patent Application Laid-Open (JP-A) No. 2005-6888 discloses details of boosting a voltage level of electricity provided from a battery and obtaining electricity to be used in driving of an FPD.

However, with a switching power supply, voltage-boosting is implemented by performing switching control of switching elements. Therefore, although the energy efficiency is good, power supply noise such as voltage ripples and the like arises because of switching frequencies in the power supply circuitry, and is manifested as image noise in radiographic images.

Accordingly, as a technology that suppresses line noise arising in captured images because of random noise components that are generated in power supply circuitry such as a series regulator or the like, JP-A No. 2003-163343 has described details of connecting a low pass filter (LPF) to the power supply circuitry and supplying a reference potential that passes through the low pass filter.

When, using the technology of JP-A No. 2003-163343, a low pass filter is provided on an electricity line used in driving of an FPD, a noise reduction effect to a certain extent is expected. However, for the supply of electric power, it is necessary to continuously operate the power supply circuitry during image-reading operations via switching elements of a switching regulator type, such as a DC-DC converter or the like, or of a charge pump type or the like. In practice therefore, microscopic ripples passing through the LPF are manifested in images, and this technology is insufficient as a countermeasure against noise.

SUMMARY

The present invention has been made in order to solve the problem described above, and an object of the present invention is to provide a radiographic imaging device that is capable, while providing high energy efficiency, of preventing the generation of noise in radiographic images that is caused by random noise components generated in power supply circuitry.

In order to achieve the objective described above, a first aspect of the present invention provides a radiographic imaging device including:

a radiation detector including
 a sensor portion that accumulates a charge generated in accordance with irradiation of radiation, and
 a switching element that is connected to the sensor portion and is switched on and off by applications of voltage;

a switching power supply that converts a voltage level of supplied electricity by switching control;

a storage section that accumulates the electricity converted by the switching power supply;

a reading section that turns on the switching element, by applying a voltage to the switching element using the electricity accumulated in the storage section, and implements a read-out of the charge accumulated at the sensor portion; and a control section that controls the switching power supply so as to
 implement switching control and cause electricity to be accumulated in the storage section at a time when charge is not being read by the reading section, and
 stop switching control at a time when charge is being read by the reading section.

In the first aspect of the present invention, the radiation detector includes sensor portions that accumulate charges in accordance with radiation being irradiated, and switching elements that are connected to the sensor portions and are switched on and off by applications of voltage.

Further, in the first aspect of the present invention, the voltage level of the supplied electricity is converted by switching control by the switching power supply, and the electricity converted by the switching power supply is accumulated in the storage section. The reading section implements a read-out of charges accumulated in the sensor portions by turning on the switching elements, by applying voltage to the switching elements using the electricity accumulated in the storage section. The storage section includes, for example, a field-effect capacitor, an electric double-layer capacitor, a lithium ion capacitor, a miniature secondary battery or the like.

In the first aspect of the present invention, the switching power supply is controlled by the control section such that switching control is performed and electricity is accumulated in the storage section at times when charges are not being read by the reading section, and the switching control is paused at times when charges are being read by the reading section.

Thus, according to the first aspect of the present invention, at times of non-reading of charge from the radiation detector, switching control by the switching power supply is implemented and electricity is accumulated in the storage section, and at times of reading of charge from the radiation detector, switching control by the switching power supply is paused and voltage is applied to the switching elements using the electricity accumulated in the storage section. Thus, the generation of noise in radiographic images that is caused by random noise components generated in power supply circuitry may be prevented, while providing high energy efficiency.

In the second aspect of the present invention,
the radiation detector may include respective pluralities of the sensor portion and the switching element, the reading section may successively apply the voltage to the plurality of switching elements and successively implements read-outs of the charges accumulated at the plurality of sensor portions, and the storage section may include a capacitance capable of storing electricity such that, when the voltage is successively applied to the plurality of switching elements and the charges from each of the plurality of sensor portions are read once, a variation in voltage level of the voltage applied to the switching elements is within a predetermined range.

Furthermore, in the third aspect of the present invention, the radiographic imaging device may further include a battery that supplies electricity at a lower voltage level than a voltage level at which the switching element is turned on, wherein the switching power supply boosts the electricity supplied from the battery to electricity at a voltage level at which the switching element is turned on by the switching control.

Furthermore, in the fourth aspect of the present invention, the switching power supply may convert electricity supplied from an external power supply to electricity at a voltage level at which the switching element is turned on by the switching control.

According to the present invention, switching control by a switching power supply is implemented and electricity is accumulated in a storage section at times when charges are not being read from a radiation detector, and switching control by the switching power supply is paused and voltages are applied to switching elements using the electricity accumulated in the storage section when charges are being read from the radiation detector. Thus, there is an effect in that the generation of noise in radiographic images that is caused by random noise components generated in power supply circuitry may be prevented, while high energy efficiency is provided.

BRIEF DESCRIPTION OF THE DRAWINGS

Exemplary embodiments of the present invention will be described in detail based on the following figures, wherein.

DETAILED DESCRIPTION

Herebelow, the exemplary embodiment for carrying out the present invention will be described in detail with reference to the drawings.

Firstly, the constitution of a radiology information system 10 relating to the exemplary embodiment will be described.

Figure 1:
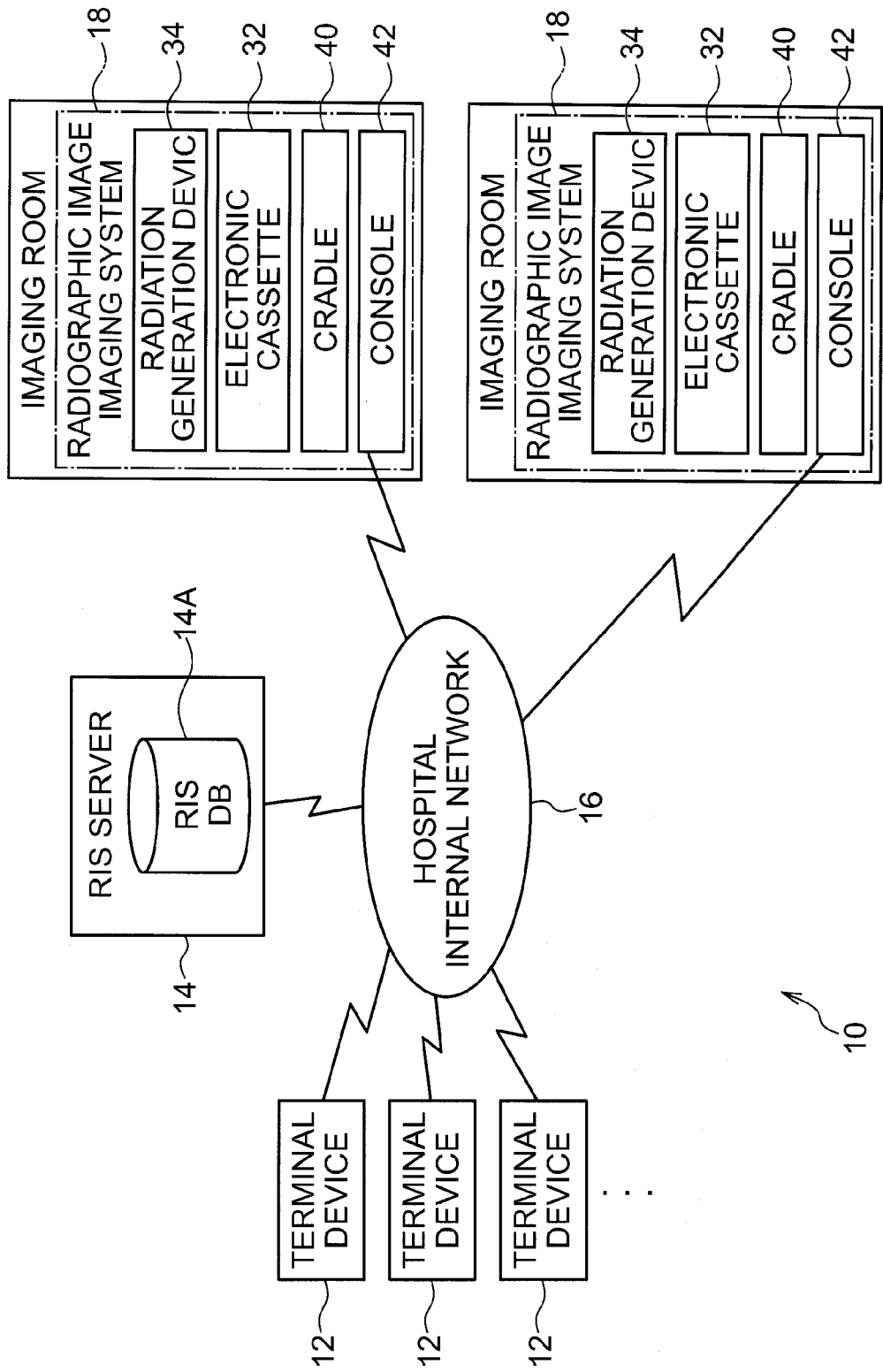
FIG. 1 is a block diagram illustrating structure of a radiology information system relating to an exemplary embodiment.

FIG. 1 shows a block diagram illustrating structural elements of the radiology information system 10 (also referred to as the RIS 10 herebelow) relating to the present exemplary embodiment.

The RIS 10 is a system for carrying out information management of clinical appointments, medical records and so forth in a radiology department, and constitutes a portion of a hospital information system (HIS).

The RIS 10 is constituted with a plural number of imaging request terminal devices 12 (also referred to as terminal devices 12 herebelow), an RIS server 14 and a radiographic imaging system 18 being connected to a hospital internal network 16, which is formed with a wired or wireless LAN (local area network). The radiographic imaging system 18 is disposed in individual radiographic imaging rooms (or operating rooms) in the hospital. Herein, the RIS 10 constitutes a portion of a hospital information system (HIS) provided in the same hospital, and an HIS server (not illustrated) that administers the whole of the HIS is also connected to the hospital internal network 16.

Each terminal device 12 is for a surgeon (doctor), a radiographer or the like to input and monitor clinical information, facility reservations and the like. Imaging requests (imaging bookings) for radiographic images are also conducted from the terminal device 12. The terminal device 12 is constituted by a personal computer with a display device, and is connected with the RIS server 14 by the hospital internal network 16, enabling communication therebetween.

The RIS server 14 receives imaging requests from the terminal devices 12 and manages an imaging schedule for radiographic images at the imaging system 18. The RIS server 14 is constituted to include a database 14A.

The database 14A is constituted to include: information relating to patients, such as information on attributes of each patient (name, gender, date of birth, age, blood type, a patient ID number and so forth), medical history, treatment history, previously captured radiographic images, and the like; information relating to electronic cassettes 32 of the imaging system 18, such as an identification number of each electronic cassette 32 and type, size, sensitivity, applicable locations of imaging (details of imaging requests that can be handled), the date of first use, the number of uses, and the like; and environmental information representing environments in which the electronic cassettes 32 are used to capture radiographic images, which is to say environments in which the electronic cassettes 32 are employed (for example, an operating room, an imaging room specially equipped for capturing radiographic images, and the like).

The imaging system 18 carries out capturing of radiographic images in accordance with control by surgeons, radiographers and the like, in response to instructions from the RIS server 14. The imaging system 18 is provided with a radiation generation device 34, the electronic cassette 32, a cradle 40, and a console 42. The radiation generation device 34 irradiates radiation X, constituted with radiation amounts depending on exposure conditions, from a radiation source 130 (see FIG. 2 and FIG. 3) at a subject of imaging. The electronic cassette 32 incorporates a radiation detector 60 (see FIG. 3) that absorbs radiation X that has passed through a patient, generates charges, and generates image information representing a radiographic image on the basis of the generated charge amounts. The cradle 40 charges a battery incorporated in the electronic cassette 32. The console 42 controls the electronic cassette 32, the radiation generation device 34 and the cradle 40.

Figure 2:
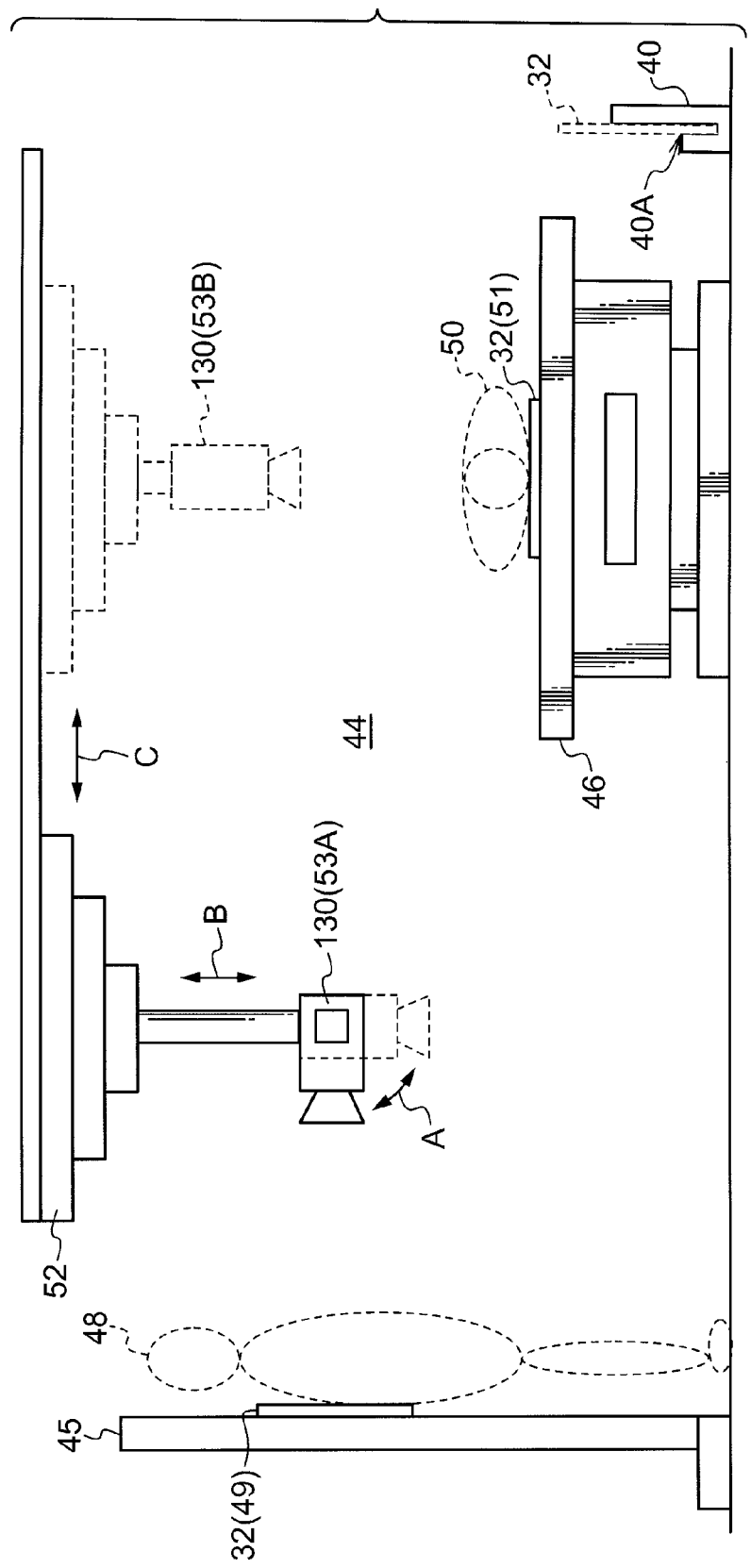
FIG. 2 is a view illustrating conditions in a radiographic imaging room in which a radiographic imaging system relating to the exemplary embodiment is disposed.

FIG. 2 is a view illustrating conditions in a radiographic imaging room 44 in which the imaging system 18 relating to the present exemplary embodiment is disposed As illustrated in FIG. 2, in the radiographic imaging room 44, a rack 45 for retaining the electronic cassette 32 when radiographic imaging is being carried out on a patient in a standing position and a bed 46 for a patient to lie on when radiographic imaging is being carried out in a lying position are provided. A space forward of the rack 45 serves as an imaging location 48 of the patient when radiographic imaging is being carried out in the standing position, and a space upward of the bed 46 serves as an imaging location 50 of the patient when radiographic imaging is being carried out in the lying position.

In the radiographic imaging room 44, in order that both radiation projection at the standing position and radiation projection at the lying position are possible with radiation from the single radiation source 130, a support movement mechanism 52 is provided that supports the radiation source 130 to be turnable (in the direction of arrow A in FIG. 2) about a horizontal axis, movable in a vertical direction (the direction of arrow B in FIG. 2) and movable in a horizontal direction (the direction of arrow C in FIG. 2). The support movement mechanism 52 is provided with each of a drive source that turns the radiation source 130 about the horizontal axis, a drive source that moves the radiation source 130 in the vertical direction and a drive source that moves the radiation source 130 in the horizontal direction (none of which are illustrated).

In the cradle 40, an accommodation portion 40A capable of accommodating the electronic cassette 32 is formed.

When being kept on standby, the electronic cassette 32 is accommodated in the accommodation portion 40A of the cradle 40, and the battery incorporated therein is charged up. At a time of capturing a radiographic image, the electronic cassette 32 is taken from the cradle 40 by a radiographer. If the imaging attitude is to be the standing position, the electronic cassette 32 is moved to and positioned at a location 49 at which the electronic cassette 32 is retained by the rack 45. If the imaging attitude is to be the lying position, the electronic cassette 32 is transferred to and positioned at a location 51 on the bed 46.

In the imaging system 18 relating to the present exemplary embodiment, the radiation generation device 34 and the console 42 are connected by respective cables, and exchanges of various kinds of information are implemented by communications by wire. The cables connecting between the equipment are not illustrated in FIG. 2. Exchanges of various kinds of information between the electronic cassette 32 and the console 42 are implemented by wireless communications.

Herein, the electronic cassette 32 is not limited to cases of use in the radiographic imaging room 44. For example, the electronic cassette 32 may also be applied to medical screenings, hospital rounds and the like.

Figure 3:
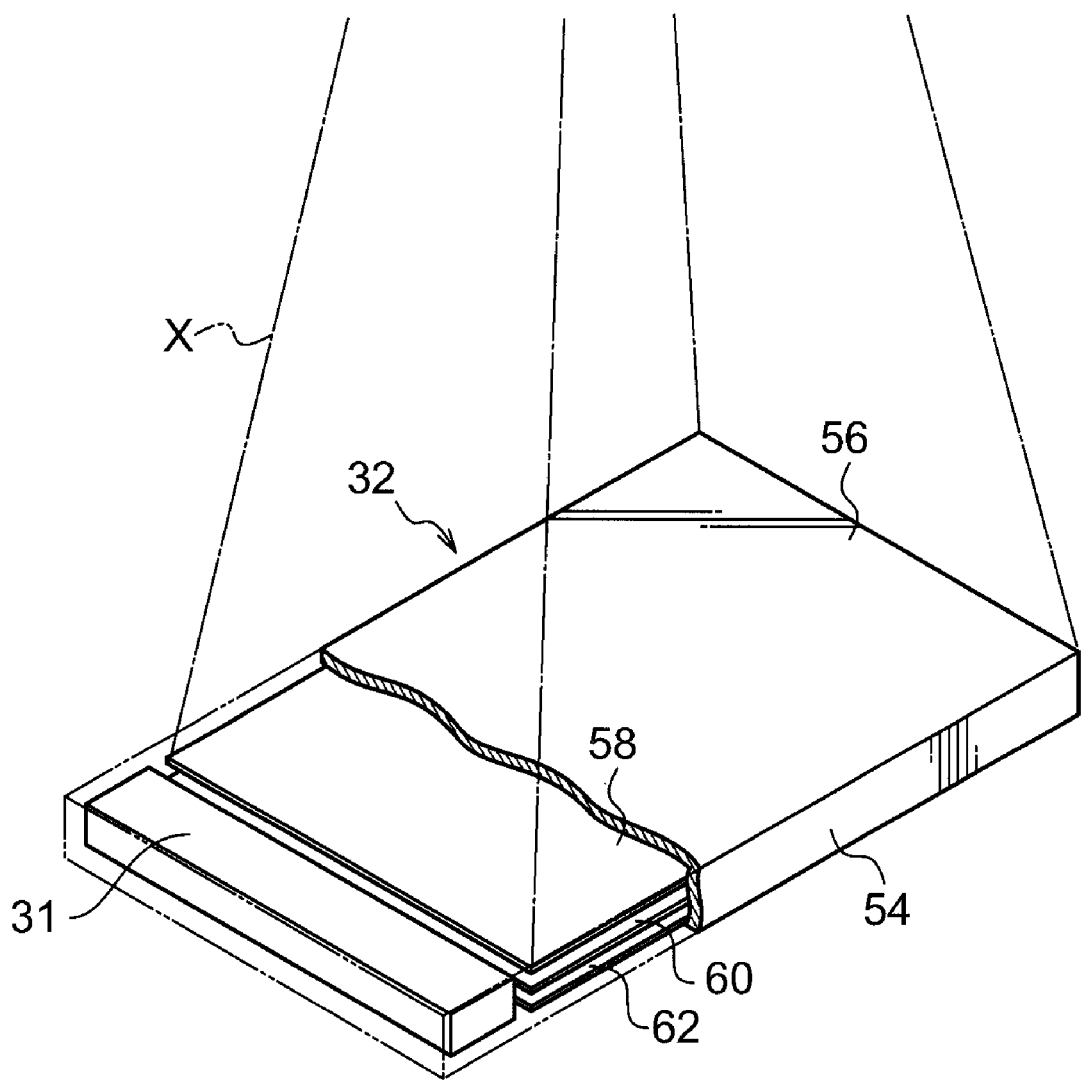
FIG. 3 is a transparent perspective view illustrating internal structure of an electronic cassette relating to the exemplary embodiment.

FIG. 3 illustrates internal structure of the electronic cassette 32 relating to the exemplary embodiment.

As shown in FIG. 3, the electronic cassette 32 is provided with a housing 54, which is formed of a material that transmits the radiation X, and is structured to be waterproof and tightly sealed. During use in an operating room or the like, blood and other microorganism contaminants and the like may adhere to the electronic cassette 32. Therefore, the electronic cassette 32 is structured to be waterproof and tightly sealed, and is washed with disinfectant as necessary. Thus, the individual electronic cassettes 32 may be repeatedly used.

Inside the housing 54, a grid 58, the radiation detector 60 and a lead plate 62 are arranged in this order from the side of an irradiation surface 56 of the housing 54 onto which the radiation X is irradiated. The grid 58 eliminates scattered rays of the radiation X caused by the patient. The radiation detector 60 detects the radiation X that has passed through the patient. The lead plate 62 absorbs back-scattered rays of the radiation X. Herein, the irradiation surface 56 of the housing 54 may be constituted as the grid 58.

A case 31 that accommodates electronic circuits, including a microcomputer, and a rechargeable secondary cell is disposed at one end of the interior of the housing 54. The radiation detector 60 and the electronic circuits are operated by electricity supplied from the secondary cell accommodated in the case 31. In order to prevent the various circuits accommodated inside the case 31 being damaged due to irradiation of the radiation X, it is desirable for lead plating or the like to be disposed at the irradiation surface 56 side of the case 31.

Figure 4:
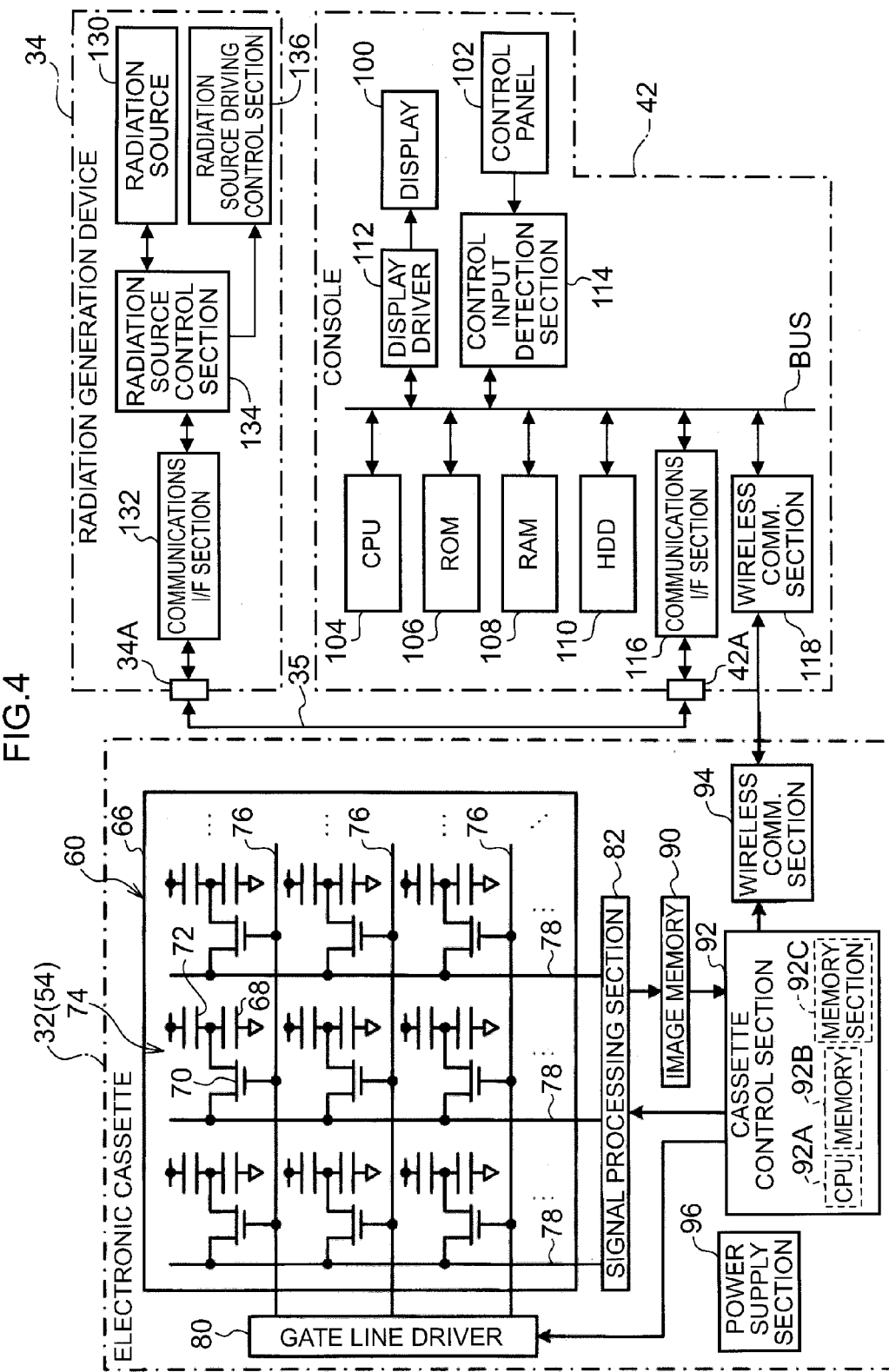
FIG. 4 is a block diagram illustrating detailed structure of the radiographic imaging system relating to the exemplary embodiment.

FIG. 4 shows a block diagram illustrating detailed structure of the radiographic imaging system 18 relating to the present exemplary embodiment.

At the radiation generation device 34, a connection terminal 34A for communicating with the console 42 is provided. At the console 42, a connection terminal 42A for communicating with the radiation generation device 34 is provided.

The radiation detector 60 incorporated into the electronic cassette 32 is structured by an optoelectronic conversion layer, which absorbs the radiation X and converts the same to electric charges, being layered onto a TFT active matrix substrate 66. The optoelectronic conversion layer is formed of, for example, noncrystalline amorphous selenium (a-Se) of which selenium is a principal component (for example, a proportional content of at least 50%). When the radiation X is irradiated thereon, the optoelectronic conversion layer generates electric charges (electron-hole pairs) thereinside with charge amounts corresponding to irradiated radiation amounts. Thus, the irradiated radiation X is converted to electric charges. Here, instead of a radiation-to-charge conversion material such as amorphous selenium that converts the radiation X to electric charges directly, the radiation detector 60 may employ a fluorescent material and optoelectronic conversion elements (photodiodes) to convert the radiation X to electric charges indirectly. As fluorescent materials, gadolinium sulfate (GOS), cesium iodide (CsI) and the like are well known. In such a case, a radiation X-to-light conversion is performed by the fluorescent material, and a light-to-electric charge conversion is carried out by the photodiodes of the optoelectronic conversion elements.

Storage capacitors 68, which accumulate the charges generated in the optoelectronic conversion layer, and pixel portions 74, which are provided with TFTs 70 for read-out of the charges accumulated in the storage capacitors 68, are numerously provided in a matrix form on the TFT active matrix substrate 66 (the optoelectronic conversion layer corresponding with each of the pixel portions 74 is schematically shown as an optoelectronic conversion portion 72 in FIG. 4). The charges that are generated in the optoelectronic conversion layer in accordance with irradiation of the radiation X onto the electronic cassette 32 are accumulated in the individual storage capacitors 68 of the pixel portions 74. Thus, the image information carried by the radiation X irradiated onto the electronic cassette 32 is converted to electric charge information and retained in the radiation detector 60.

Plural gate lines 76 and plural data lines 78 are provided in the TFT active matrix substrate 66. The gate lines 76 extend in a certain direction (a column direction) and are for turning the TFTs 70 of the pixel portions 74 on and off. The data lines 78 extend in a direction crossing the gate lines 76 (a row direction) and are for reading out the accumulated charges from the storage capacitors 68 via the TFTs 70 that have been turned on. The respective gate lines 76 are connected to a gate line driver 80, and the respective data lines 78 are connected to a signal processing section 82. When charges are accumulated in the storage capacitors 68 of the respective pixel portions 74, the TFTs 70 of the respective pixel portions 74 are turned on sequentially, column by column, by signals provided through the gate lines 76 from the gate line driver 80. The charges accumulated in the storage capacitors 68 of the pixel portions 74 for which the TFTs 70 have been turned on are transferred through the data lines 78 as charge signals and inputted to the signal processing section 82. Thus, the charges accumulated in the storage capacitors 68 of the respective pixel portions 74 are sequentially read out in column units.

The signal processing section 82 detects the charges that have been accumulated in the storage capacitors 68 of the pixel portions 74, in column units, and outputs digital image information.

An image memory 90 is connected to the signal processing section 82, and the image information outputted from the signal processing section 82 is sequentially stored in the image memory 90. The image memory 90 has a storage capacity capable of storing a predetermined number of frames of image information representing radiographic images. Each time a read-out of charges for one line is carried out, image information corresponding to the one line that is read is sequentially stored in the image memory 90.

The image memory 90 is connected with a cassette control section 92 that controls overall operations of the electronic cassette 32. The cassette control section 92 is realized by a microcomputer, and is provided with a CPU 92A, a memory 92B including ROM and RAM, and a non-volatile memory section 92C formed with an HDD, flash memory or the like.

A wireless communications section 94 is connected to the cassette control section 92. The wireless communications section 94 complies with wireless LAN (local area network) standards, typified by IEEE (Institute of Electrical and Electronics engineers) 802.11a/b/g and the like. The wireless communications section 94 controls transfers of various kinds of information between the cassette control section 92 and external equipment by wireless communications. The cassette control section 92 is capable of wireless communications with the console 42 via the wireless communications section 94, and may exchange various kinds of information with the console 42. The cassette control section 92 stores later-described exposure conditions which are received from the console 42, and starts a read-out of charges in accordance with the exposure conditions.

The electronic cassette 32 is also provided with a power supply section 96. The various circuits and elements mentioned above (the gate line driver 80, the signal processing section 82, the image memory 90, the wireless communications section 94, the microcomputer that functions as the cassette control section 92, and the like) are driven by electrical power supplied from the power supply section 96. The power supply section 96 incorporates a battery (a rechargeable secondary cell), so as not to impede portability of the electronic cassette 32, and provides power to the various circuits and elements from the charged battery. Wiring connecting the power supply section 96 with the various circuits and elements is not illustrated in FIG. 4.

Figure 5:
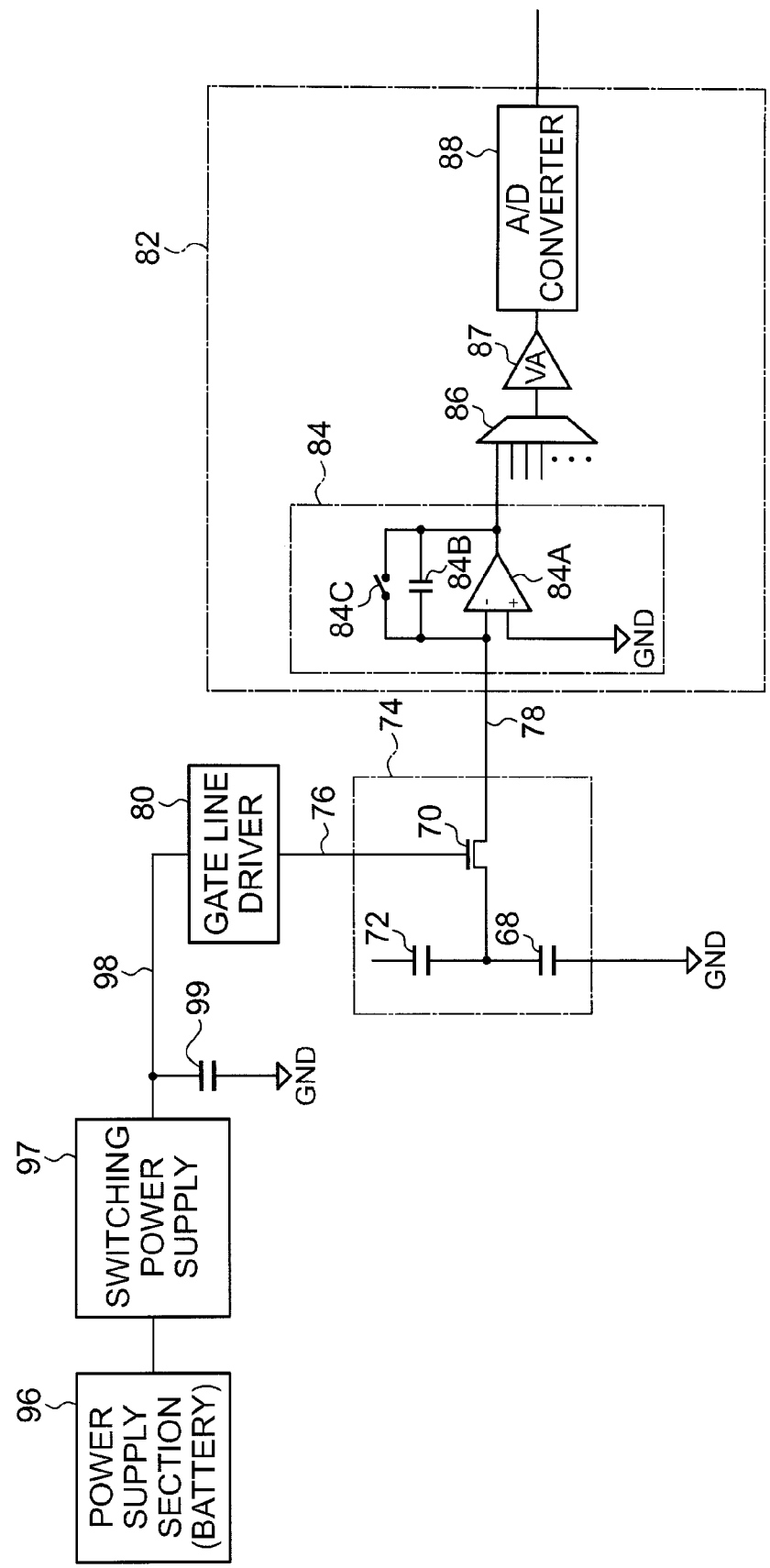
FIG. 5 is an equivalent circuit diagram concerning a single-pixel portion of a radiation detector relating to the exemplary embodiment.

FIG. 5 is an equivalent circuit diagram concerning a single-pixel portion of the radiation detector 60 relating to the present exemplary embodiment.

As shown in FIG. 5, the source of the TFT 70 is connected to the data line 78, and the data line 78 is connected to the signal processing section 82. The drain of the TFT 70 is connected to the storage capacitor 68 and the optoelectronic conversion portion 72, and the gate of the TFT 70 is connected to the gate line 76. This gate line 76 is connected to the gate line driver 80.

In the present exemplary embodiment, the power supply section 96 supplies electricity at, for example, 3.3 V. In the present exemplary embodiment, a switching power supply 97, such as a DC-DC converter or the like, is used to boost the low voltage level electricity supplied from the power supply section 96 and obtain a voltage at a predetermined voltage level for turning on the TFTs 70 (for example, 20 V). The switching power supply 97 is connected to the cassette control section 92, and implements switching control that boosts the voltage level of the electricity supplied from the power supply section 96 in accordance with control by the cassette control section 92. The electricity that has been boosted by the switching power supply 97 is supplied through wiring 98 to the gate line driver 80. On this wiring 98, a capacitor 99 is provided that is capable of accumulating the electricity that has been voltage-boosted by the switching power supply 97.

The signal processing section 82 is provided with an individual sample and hold circuit 84 for each data line 78. The charge signals transferred through the respective data lines 78 are retained at the sample and hold circuits 84. Each sample and hold circuit 84 is structured to include an op amp 84A and a capacitor 84B, and converts charge signals to analog voltages. The sample and hold circuit 84 is further provided with a switch 84C, which serves as a reset circuit that shorts together the two electrodes of the capacitor 84B and discharges charge accumulated in the capacitor 84B.

A multiplexer 86, a voltage amplifier 87 and an A/D (analog-to-digital) converter 88 are connected, in this order, to the output side of the sample and hold circuit 84. The charge signals retained by the respective sample and hold circuits are converted to analog voltages, sequentially (serially) inputted into the multiplexers 86, amplified in voltage by the voltage amplifiers 87, and converted to digital image information by the A/D converters 88.

The console 42 (see FIG. 4) is structured to serve as a server computer. The console 42 is provided with a display 100, which displays control menus, captured radiographic images and the like, and a control panel 102, which is structured to include plural keys and at which various kinds of information and control instructions are inputted.

The console 42 relating to the present exemplary embodiment is provided with: a CPU (central processing unit) 104 that administers operations of the device as a whole; a ROM (read-only memory) 106 at which various programs, including a control program, and suchlike are stored in advance; a RAM (random access memory) 108 that temporarily stores various kinds of data; an HDD (hard disc drive) 110 that stores and retains various kinds of data; a display driver 112 that controls displays of various kinds of information at the display 100; a control input detection section 114 that detects control states at the control panel 102; a communications interface (I/F) section 116 that is connected to the connection terminal 42A and exchanges various kinds of information, such as the later-described exposure conditions, attitude information, information on the state of the radiation generation device 34 and the like, with the radiation generation device 34 via the connection terminal 42A and a communications cable 35; and a wireless communications section 118 that exchanges various kinds of information, such as the exposure information, image information and the like, with the electronic cassette 32 by wireless communications.

The CPU 104, the ROM 106, the RAM 108, the HDD 110, the display driver 112, the control input detection section 114, the communications I/F section 116 and the wireless communications section 118 are connected to one another by a system bus. Thus, the CPU 104 may implement access to the ROM 106, the RAM 108 and the HDD 110, and may implement each of control of display of various kinds of information at the display 100 via the display driver 112, control of exchanges of various kinds of information with the radiation generation device 34 via the communications I/F section 116, and control of exchanges of various kinds of information with the electronic cassette 32 via the wireless communications section 118. The CPU 104 may also acquire states of control by users from the control panel 102 via the control input detection section 114.

The radiation generation device 34 is provided with the radiation source 130 that outputs the radiation X, a communications I/F section 132, a radiation source control section 134, and a radiation source driving control section 136. The communications I/F section 132 exchanges various kinds of information, such as the exposure conditions, attitude information, information on the state of the radiation generation device 34 and the like, with the console 42. The radiation source control section 134 controls the radiation source 130 on the basis of the received exposure conditions. The radiation source driving control section 136 controls operations of the support movement mechanism 52 by controlling supplies of power to the drive sources provided at the support movement mechanism 52.

The radiation source control section 134 is realized by a microcomputer, and stores the received exposure conditions, attitude conditions and the like. The exposure conditions received from the console 42 include information such as a tube voltage, a tube current, an irradiation duration and the like. The attitude information includes information representing whether the imaging attitude is the standing position or the lying position. When the imaging attitude specified by the received attitude information is the standing position, the radiation source control section 134 controls the support movement mechanism 52 via the radiation source driving control section 136 such that the radiation source 130 is disposed at a standing position imaging location 53A (see FIG. 2; a location from which emitted radiation is irradiated laterally at a patient disposed at the imaging location 48). When the imaging attitude specified by the received attitude information is the lying position, the radiation source control section 134 controls the support movement mechanism 52 via the radiation source driving control section 136 such that the radiation source 130 is disposed at a lying position imaging location 53B (see FIG. 2; a location from which emitted radiation is irradiated from above at a patient disposed at the imaging location 50). Then the radiation X is irradiated from the radiation source 130 in accordance with the received exposure conditions.

Next, operation of the imaging system 18 relating to the present exemplary embodiment will be described.

When a radiographic image is to be captured, the terminal device 12 (see FIG. 1) receives an imaging request including environment information from a surgeon or radiographer. The imaging request specifies the environment in which the electronic cassette 32 is to be used, a time/date of imaging, an area that is to be the object of imaging, the imaging attitude, the tube voltage, and an amount of radiation to be irradiated.

The terminal device 12 reports details of the received imaging request to the RIS server 14. The RIS server 14 stores the details of the imaging request reported from the terminal device 12 in the database 14A.

The console 42, by accessing the RIS server 14, acquires details of the imaging request and associated environment information from the RIS server 14, and displays details of the imaging request at the display 100.

The console 42 sends attitude information representing the imaging attitude of the radiographic imaging to be performed thereafter to the radiation generation device 34. Accordingly, the radiation source control section 134 of the radiation generation device 34 controls the radiation source driving control section 136 such that the radiation source 130 is disposed at the location corresponding to the imaging attitude specified by the received attitude information.

The surgeon, radiographer or the like starts the capture of the radiographic image in accordance with the details of the imaging request displayed at the display 100.

For example, when a radiographic image of an affected area of a patient reclining on the bed 46 as shown in FIG. 2 is to be imaged, the surgeon, radiographer or the like disposes the electronic cassette 32 between the affected area of the patient and the bed 46 in accordance with the area and angle of imaging, and disposes the radiation generation device 34 above the affected area. The surgeon, radiographer or the like carries out exposure condition setting operations at the control panel 102 of the console 42, to set a tube voltage, tube current and irradiation duration for when the radiation X is irradiated, depending on the area of the patient to be imaged and imaging conditions and the like.

When the exposure condition setting operations are carried out at the control panel 102, the console 42 sends the specified exposure conditions to the radiation generation device 34 and the electronic cassette 32. Hence, the radiation source control section 134 performs exposure preparation based on the received exposure conditions.

When the exposure preparation of the radiation generation device 34 is complete, the surgeon, radiographer or the like performs an imaging instruction operation at the control panel 102 of the console 42 to instruct the imaging. When the exposure instruction operation is performed at the control panel 102, the console 42 sends instruction information instructing the start of exposure to the radiation generation device 34 and the electronic cassette 32. Hence, the radiation source 130 generates and emits radiation with the tube voltage, tube current and irradiation duration according to the exposure conditions that the radiation generation device 34 has received from the console 42.

The radiation X irradiated from the radiation source 130 passes through the patient and subsequently reaches the electronic cassette 32. As a result, charges are accumulated in the storage capacitors 68 of the pixel portions 74 of the radiation detector 60 incorporated in the electronic cassette 32.

After the duration specified in the exposure conditions has passed since the cassette control section 92 of the electronic cassette 32 received the instruction information instructing the start of imaging, the cassette control section 92 controls the gate line driver 80, ON signals are successively outputted from the gate line driver 80 to the gate lines 76 line by line, and the TFTs 70 connected to the gate lines 76 are turned on line by line.

Here, while the ON signals are being successively outputted from the gate line driver 80 to the gate lines 76 line by line and the charges accumulated in the storage capacitors 68 are being successively read out line by line, switching control is being performed by the switching power supply 97. When boosting of the voltage level of the electricity supply from the power supply section 96 is performed, power supply noise such as voltage ripples and the like is generated, because of the switching frequencies, and is even manifested as image noise in the radiographic image.

Accordingly, in the electronic cassette 32 relating to the present exemplary embodiment, the switching power supply 97 performs control such that, at times of non-reading of charges by the gate line driver 80, switching control is implemented and electricity is accumulated in a storage section (the capacitor 99 in this example), and at times of reading of charges by the gate line driver 80, the switching control is paused.

Figure 6:
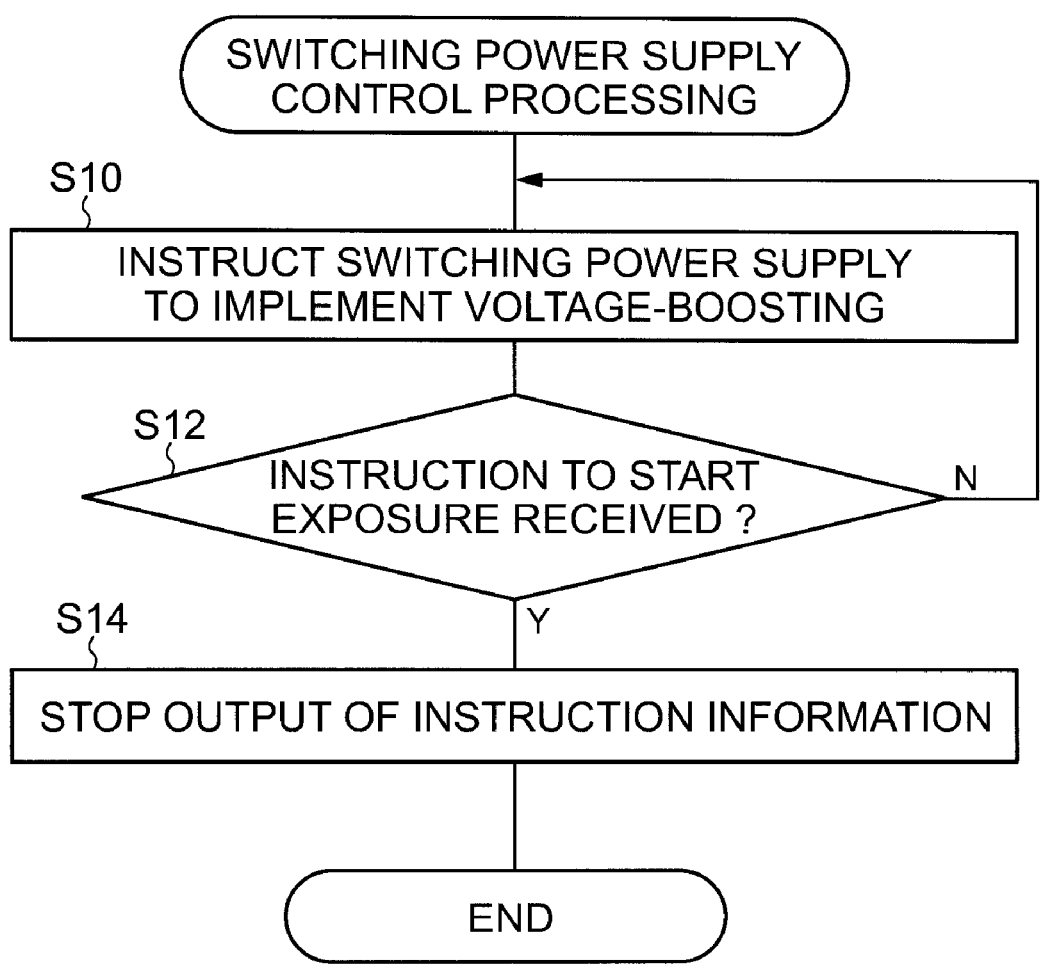
FIG. 6 is a flowchart illustrating a flow of processing of a switching power supply control processing program relating to the exemplary embodiment.

FIG. 6 is a flowchart illustrating a flow of processing of a switching power supply control processing program that is executed by the CPU 92A. This program is stored in advance in a predetermined region of the memory 92B (in ROM), and is executed by the CPU 92A when the exposure conditions are received from the console 42.

In step S10 of FIG. 6, instruction information instructing that boosting be performed is outputted to the switching power supply 97. When the switching power supply 97 receives the instruction information instructing that boosting be performed, the switching power supply 97 performs switching control and boosts the voltage of the voltage level of the electricity supplied from the power supply section 96. Hence, the electricity at the voltage level that has been boosted by the switching power supply 97 is accumulated at the capacitor 99.

Then, in step S12, it is determined whether or not instruction information instructing the start of exposure has been received from the console 42. When this determination is positive, the processing advances to step S14, but when the result of this determination is negative, the processing returns to step S10.

Then, in step S14, the output to the switching power supply 97 of the instruction information instructing that the voltage be boosted is stopped and the processing ends. Accordingly, the switching power supply 97 stops the switching control.

The gate line driver 80 outputs the ON signals to the gate lines 76 and applies voltage to the TFTs 70 line by line, using the electricity that has been accumulated at the capacitor 99. Thus, the TFTs 70 are successively turned on and the charges accumulated in the storage capacitors 68 are read out line by line.

Now, when the gate line driver 80 applies the voltage to the gate lines 76 line by line using the electricity that has been accumulated at the capacitor 99, a little of the electricity is consumed at each of the gate lines 76, and the voltage level of voltages that are applied to the gate lines 76 falls for the gate lines 76 to which the voltage is applied later.

For example, if the number of the gate lines 76 is 3,000 and voltage is applied to each gate line 76 for 15 μs, then voltage is being applied for 3000×15 μs=45 ms in a read-out of one image. Therefore, if the current flowing in each gate line 76 is 0.1 mA, the charge that is required for the read-out of one image is 45 ms×0.1 mA=4.5 μC.

In such a case, a minimum capacitance required for the capacitor 99 is 20 V×4.5 μC=90 μF. However, this corresponds to all the electricity being required for the read-out. With this capacitance, the electricity at 20 V that has been accumulated at the capacitor 99 will be at 0 V at the end of a read-out, and reading of the image may not be possible.

Moreover, when the voltage level applied to the gates falls, the resistance values of the TFTs 70 increase and it is harder for the accumulated charges to flow.

Thus, this is not practical unless a fall in voltage supplied from the capacitor 99 is around 20% or less. If 5 V was to be supplied and the capacitor 99 was a capacitor such that the voltage fell by 50% in a read-out of one image, the 5 V circuitry would cease to operate partway through the read-out.

Accordingly, in the present exemplary embodiment, in order to keep a variation in voltage level of the voltages being applied to the TFTs 70 to a fall of not more than 10% to 20% over the reading of one image, the capacitance of the capacitor 99 is set to about five to ten times higher than a minimum required capacitance. For example, if the capacitor is a capacitance of 90 μF×10 (in parallel)=900 μF, then even if an amount corresponding to 90 μF is consumed in the reading of one image, 90% will remain.

The variation in voltage level of the voltages applied to the TFTs 70 over the reading of one image is ideally 0%. The greater the capacitance of the capacitor 99, the closer the variation may be brought to 0%, but also the greater the size of the capacitor 99. On the other hand, if the circuitry is resistant to falls in power supply (i.e., has a broad driving voltage range) and works even if, for example, the variation in voltage level is 50%, the overall apparatus may be made smaller in size by reducing the capacitance of the capacitor 99.

When the radiation detector 60 turns on the TFTs 70 connected to the gate lines 76 line by line, the charges accumulated in the storage capacitors 68 flow out into the respective data lines 78 as charge signals, line by line. The charge signals that have flowed out into the data lines 78 are inputted into the respective sample and hold circuits 84 and converted to voltage signals, and the converted voltage signals are sequentially (serially) inputted into the multiplexers, converted to digital image information by the A/D converters, and stored in the image memory 90. The cassette control section 92 sends the image information stored in the image memory 90 to the console 42 by wireless communications.

At the console 42, image processing to perform various kinds of correction, such as shading correction and the like, is applied to the received image information, and the corrected image information is stored in the HDD 110. The image information stored in the HDD 110 is displayed at the display 100, for checking of the captured radiographic image and the like, and is transferred to the RIS server 14 and saved into the RIS database. Hence, the captured radiographic image may be displayed at a display of the terminal devices 12, and a surgeon may carry out diagnostics, screening or the like of the radiographic image.

As described hereabove, according to the present exemplary embodiment, switching control is performed by the switching power supply 97 and electricity is accumulated at the capacitor 99 at times when charges are not being read from the radiation detector 60, and at times when charges are being read from the radiation detector 60, switching control by the switching power supply 97 is paused and the electricity accumulated at the capacitor 99 is used to apply voltage to the TFTs 70. Thus, the generation of noise in radiographic images that is caused by random noise components generated in the switching power supply 97 may be prevented, while providing high energy efficiency.

Anyway, in the exemplary embodiment described above, a case of application to the electronic cassette 32, which is a portable radiographic imaging device, has been described. However, the present invention is not limited thus and may be applied to a stationary radiographic imaging device. Furthermore, the present invention may be applied to a radiographic imaging device that, rather than electricity supplied from a battery, converts electricity supplied from an external power source, such as a commercial power supply or the like, to electricity with a voltage level that will turn on the TFTs 70 by switching control.

Further yet, a case has been described in the above exemplary embodiment in which voltage-boosting is performed by the switching power supply 97 until instruction information instructing the start of exposure is received. However, the present invention is not to be limited thus. For example, boosting may be performed by the switching power supply 97 until just before a read-out of charges from the radiation detector 60 starts.

Moreover, the constitution of the radiology information system 10 described in the above exemplary embodiment (see FIG. 1), the constitution of the imaging system 18 (see FIG. 2 and FIG. 4) and the constitution of the electronic cassette 32 (see FIG. 3) are examples and obviously may be altered in accordance with circumstances within a scope not departing from the spirit of the present invention.

Furthermore, the flow of the switching power supply control processing processing described in the above exemplary embodiment (see FIG. 6) is an example and obviously may be altered in accordance with circumstances within a scope not departing from the spirit of the present invention.

What is claimed is:

1. A radiographic imaging device comprising:
    a radiation detector comprising
        a sensor portion that accumulates a charge generated in accordance with irradiation of radiation, and
        a switching element that is connected to the sensor portion and is switched on and off by applications of voltage;
    a switching power supply that converts a voltage level of supplied electricity by switching control;
    a storage section that accumulates the electricity converted by the switching power supply;
    a reading section that turns on the switching element, by applying a voltage to the switching element using the electricity accumulated in the storage section, and implements a read-out of the charge accumulated at the sensor portion; and
    a control section that controls the switching power supply so as to
        implement switching control and cause electricity to be accumulated in the storage section at a time when charge is not being read by the reading section, and
        stop switching control at a time when charge is being read by the reading section.

2. The radiographic imaging device according to claim 1, wherein
    the radiation detector includes respective pluralities of the sensor portion and the switching element,
    the reading section successively applies the voltage to the plurality of switching elements and successively implements read-outs of the charges accumulated at the plurality of sensor portions, and
    the storage section includes a capacitance capable of storing electricity such that, when the voltage is successively applied to the plurality of switching elements and the charges from each of the plurality of sensor portions are read once, a variation in voltage level of the voltage applied to the switching elements is within a predetermined range.

3. The radiographic imaging device according to claim 2, further comprising a battery that supplies electricity at a lower voltage level than a voltage level at which the switching element is turned on,
    wherein the switching power supply boosts the electricity supplied from the battery to electricity at a voltage level at which the switching element is turned on by the switching control.

4. The radiographic imaging device according to claim 2, wherein the switching power supply converts electricity supplied from an external power supply to electricity at a voltage level at which the switching element is turned on by the switching control.

5. The radiographic imaging device according to claim 1, further comprising a battery that supplies electricity at a lower voltage level than a voltage level at which the switching element is turned on,
    wherein the switching power supply boosts the electricity supplied from the battery to electricity at a voltage level at which the switching element is turned on by the switching control.

6. The radiographic imaging device according to claim 1, wherein the switching power supply converts electricity supplied from an external power supply to electricity at a voltage level at which the switching element is turned on by the switching control.

* * * * *